United States Patent [19]

Wade, Jr.

[11] Patent Number: 5,183,278
[45] Date of Patent: Feb. 2, 1993

[54] RECYCLING TRASH CAN

[76] Inventor: Merle W. Wade, Jr., 8 Circle Rd., Millersville, Pa. 17551

[21] Appl. No.: 608,274

[22] Filed: Nov. 2, 1990

[51] Int. Cl.⁵ .............................................. B62B 3/04
[52] U.S. Cl. ............................... 280/47.35; 206/504; 220/23.4; 220/909; 280/79.2; 280/79.5; 403/331; 403/341
[58] Field of Search ............... 280/47.26, 47.35, 47.19, 280/79.5, 79.2; 206/504; 220/23.4, 23.83, 909; 403/331, 341

[56] References Cited

U.S. PATENT DOCUMENTS

| | | | |
|---|---|---|---|
| 3,358,878 | 12/1967 | Ostborg et al. | 220/23.83 |
| 3,904,218 | 9/1975 | Kostic | 280/79.2 |

FOREIGN PATENT DOCUMENTS

| | | | |
|---|---|---|---|
| 21965 | 3/1917 | Denmark | 220/23.83 |
| 268680 | 4/1927 | United Kingdom | 220/23.4 |

*Primary Examiner*—Andres Kashnikow
*Assistant Examiner*—Eric Culbreth

[57] ABSTRACT

The invention relates to a waste management system with interlocking portions to connect various refuse containers. The refuse containers are designated for holding different types of garbage, glass, paper, metal, etc.

1 Claim, 1 Drawing Sheet

RECYCLING TRASH CAN

BACKGROUND OF THE INVENTION

1. Field of the Invention

The invention relates to the field of garbage containers and, in particular, to a system of refuse holders with designated portions for holding different materials e.g.: glass, paper, metals, etc. The refuse containers are built to fit three to a compartment and have interlocking sections to facilitate their connection to one another.

2. Description of the Prior Art

While there are refuse containing devices that are known, none that applicant is aware of has the unique interlocking members to facilitate the connection of the three separate trash containers to one another on the bottom tray.

SUMMARY OF THE INVENTION

The garbage container of the present invention comprises a wheeled bottom tray that has casters and provides the means of support for the three refuse chambers that fit onto the bottom tray. The refuse containers are designated for which type of refuse they are for and have triangular shaped interior walls and circular outer walls, i.e.: like a pie shape, to permit them to fit on to the bottom tray. On the inner walls of each refuse container is a locking member with a protruding shape, each of the inner walls of the three containers has the protruding shape and the shape can interlock with each of the other shapes so that a close fitting connection may be maintained between the three containers.

It is the object of this invention to provide a refuse container with different sections for different types of refuse.

Another objective of the invention is to provide a refuse container with separate compartments that can be separately removed for convenient trash collection.

Another objective is to provide a refuse container with different sections that can interlock with one another.

Other advantages of the invention should be readily apparent to those skilled in the art once the invention has been described.

DESCRIPTION OF THE PREFERRED EMBODIMENT

Figure 1:
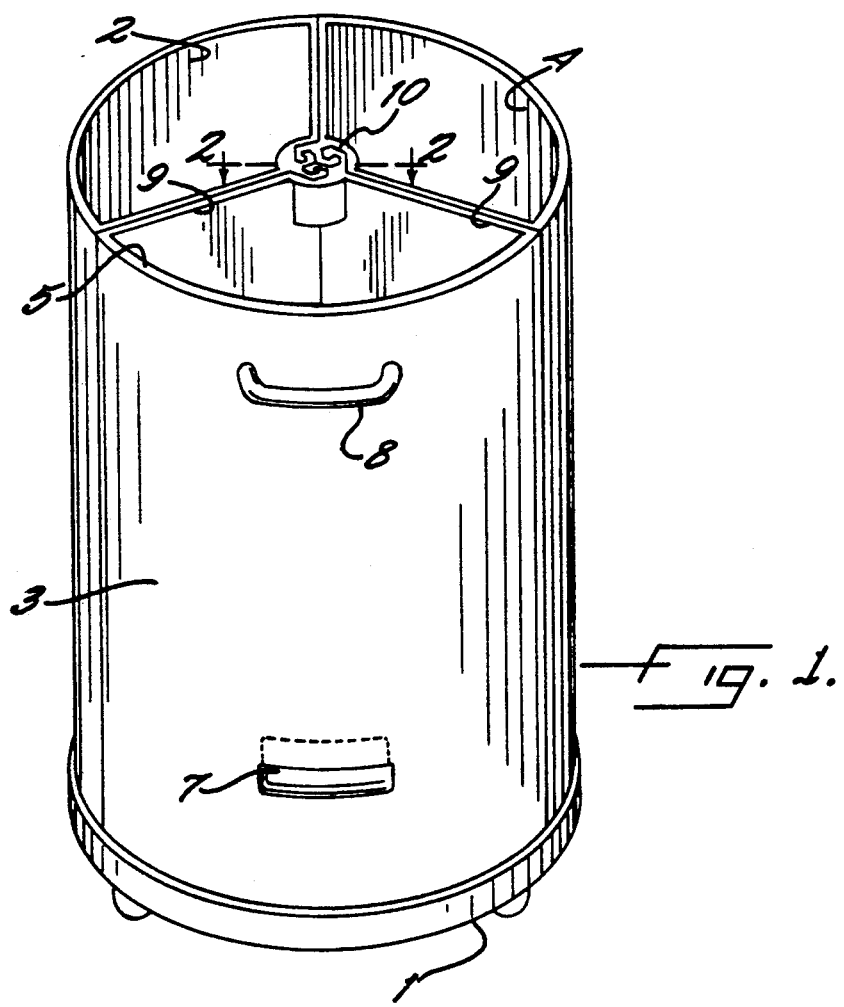
FIG. 1 shows the overall construction of compartmented refuse container.

The refuse container of the present invention is substantially as shown in FIG. 1. The bottom tray 1 provides a means of holding the different refuse containers which fit onto the tray. The tray has casters and drainage holes and is circular so that the three trash compartments 2-4, which assume a circular shape when all three are put together, will fit conveniently onto the tray.

Figure 2:
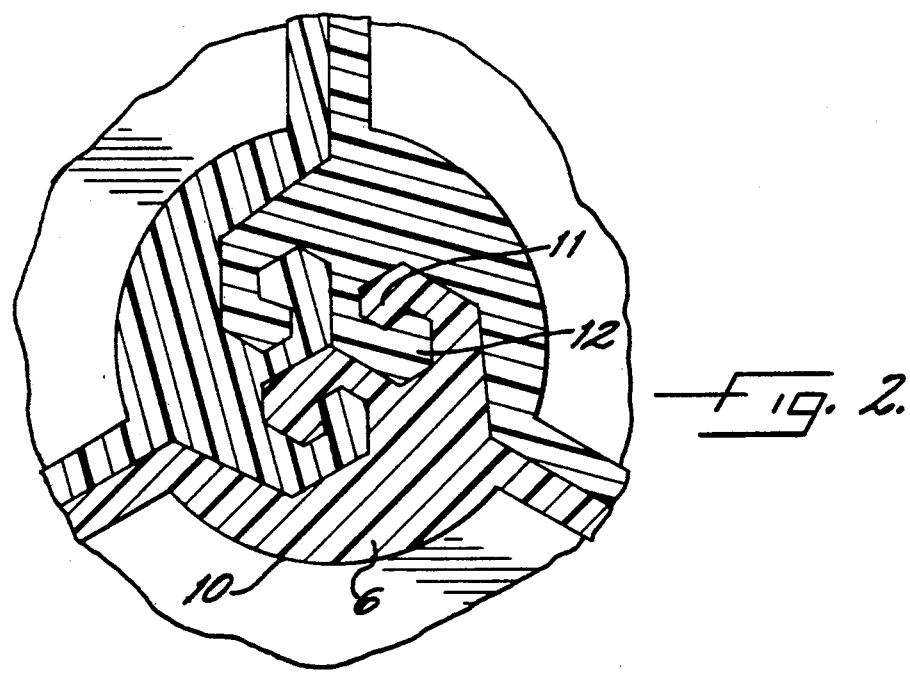
FIG. 2 shows the locking means from above.

The compartments are shown in the upright view shown as part of FIG. 1. The outer walls 5 of the compartments are circular shaped and the overall view of one compartment resembles a pie shape with a locking portion 6 at the very tip when viewed from above (see FIG. 2). The outside walls of at least one of the compartments should have a recessed portion 7 to provide a means for the trash collection worker to grip the separate container and lift if for dumping. There is also shown an optional handle 8 which may also be used on one of the containers or all three. There are drainage holes in the base of the bottom tray to drain water etc.

The inside portions 9 of the walls of the containers are triangular shaped as they fit against one another. The triangular shaped pieces do not come to an actual point, but rather, they stop short of a point and have a circular construction 10 with the locking member 6 as shown in the top view shown in FIG. 2. Each inner wall 10 of a separate container has one of the identical shaped locking members. The locking members are two pronged and extend outwardly from the inner wall. The points of the prongs assume a hexagonal shape 11 so that an inner space 12 is formed to the inside of the point as one looks down upon the locking means. The identical shaped prongs have the ability to fit into one another and thus the three separate containers are locked in to each other form a close fit.

The locking members do not have to extend the entire length (i.e.: from the top edge to the bottom edge) of the inside walls but should be of enough length so that they can hold themselves together during routine movements.

Having refuse containers that can be locked together is a help when the trash tray is wheeled or other wise moved with the three containers. The containers can be readily separated from one anther when the time comes to unload the separate refuse contained in each on. The containers can be lifted up and thus out of the locking members so that they can be individually dumped.

The separate containers are marked for different refuse, for example: paper, aluminum, glass products. The designations may vary for the different types of refuse that may be collected.

I claim:

1. A trash collection means comprising, bottom tray having wheels and of circular shape, three refuse containers each having a circular outer wall, two side walls and an inner wall so each of said containers resemble a pie shape when viewed from above, said three containers capable of fitting alongside each other within said bottom tray, said containers having two locking members on said inner wall, each locking member having an extended portion, said extended portion bent inward from said interior wall along three approximately 120 degree bent portions, and an end portion attached to said extended portion, said end portion having a hexagonal shape when viewed from above, said hexagonal portion forming a hexagonal shaped inner space along with said bent portions, said inner space capable of enclosing an end portion so that said locking portions may fit into one another.

* * * * *